United States Patent
Junk et al.

(10) Patent No.: US 10,234,058 B2
(45) Date of Patent: Mar. 19, 2019

(54) METHODS AND APPARATUS OF ASSESSING A TEST OF A SOLENOID VALVE VIA A POSITIONER

(71) Applicant: Fisher Controls International LLC, Marshalltown, IA (US)

(72) Inventors: Kenneth Junk, Marshalltown, IA (US); Shannon Jelken, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 239 days.

(21) Appl. No.: 15/298,726

(22) Filed: Oct. 20, 2016

(65) Prior Publication Data

US 2018/0112797 A1    Apr. 26, 2018

(51) Int. Cl.
*F16K 37/00* (2006.01)
*F15B 19/00* (2006.01)
(Continued)

(52) U.S. Cl.
CPC ........ *F16K 37/0091* (2013.01); *F15B 19/005* (2013.01); *F16K 11/044* (2013.01);
(Continued)

(58) Field of Classification Search
CPC ...... F15B 19/005; F15B 20/00; F15B 20/008; F15B 2211/6306; F15B 2211/6313;
(Continued)

(56) References Cited

U.S. PATENT DOCUMENTS 3,829,842 A * 8/1974 Langdon ............. G05B 19/058
                                                           700/159
4,428,223 A * 1/1984 Trevisan ............. F16K 37/0083
                                                           73/1.72
(Continued)

FOREIGN PATENT DOCUMENTS

WO    2014197422    12/2014

OTHER PUBLICATIONS

Emerson Process Management, "Fisher FIELDVUE™ DVC6200 Digital Valve Controller—Instruction Manual D103409X012," Fisher Controls International LLC, Dec. 2013, 148 pages.
(Continued)

*Primary Examiner* — William McCalister
(74) *Attorney, Agent, or Firm* — Hanley, Flight & Zimmerman, LLC

(57) ABSTRACT

Methods and apparatus of assessing a test of a solenoid valve via a positioner are disclosed. An example apparatus includes a solenoid valve to enable an actuator to close an emergency valve and a valve positioner fluidly and communicatively coupled to the solenoid valve. The valve positioner is to instruct the solenoid valve to transition the solenoid valve from a first state to a second state. The valve positioner is to monitor a pressure change of a pressure chamber of the actuator in fluid communication with the solenoid valve relative to an initial pressure for a monitoring duration. The valve positioner is to identify a maximum pressure change during the monitoring duration and determine a ready state of the solenoid valve when the maximum pressure change is greater than a minimum trip value and the pressure change at a monitoring end time is less than a maximum reset value.

23 Claims, 10 Drawing Sheets

(51) Int. Cl.
*F16K 11/044* (2006.01)
*F16K 31/06* (2006.01)
*F15B 20/00* (2006.01)

(52) U.S. Cl.
CPC ...... *F16K 31/0627* (2013.01); *F16K 37/0041* (2013.01); *F15B 20/008* (2013.01); *F15B 2211/6313* (2013.01); *F15B 2211/855* (2013.01); *F15B 2211/857* (2013.01); *F15B 2211/8636* (2013.01); *F15B 2211/8755* (2013.01)

(58) Field of Classification Search
CPC ........ F15B 2211/6658; F15B 2211/857; F15B 2211/8613; F15B 2211/8636; F15B 2211/8755; F15B 5/006; F16K 37/0091; F16K 11/044; F16K 31/06; F16K 31/0627; F16K 31/0041; H04L 63/0281; H04L 63/0485; H04L 63/166
See application file for complete search history.

(56) References Cited

U.S. PATENT DOCUMENTS

| | | | | |
|---|---|---|---|---|
| 4,556,956 | A * | 12/1985 | Dickenson | F01D 17/24 415/17 |
| 4,557,136 | A * | 12/1985 | Greenhalf | F16K 37/0083 137/469 |
| 5,197,328 | A * | 3/1993 | Fitzgerald | F16K 37/0091 137/487.5 |
| 5,329,956 | A | 7/1994 | Marriott et al. | |
| 5,558,115 | A | 9/1996 | Lenz et al. | |
| 5,573,032 | A * | 11/1996 | Lenz | G05D 7/005 137/486 |
| 6,119,515 | A * | 9/2000 | Kemmler | G05B 19/4062 73/168 |
| 6,176,247 | B1 * | 1/2001 | Winchcomb | G05B 9/02 137/14 |
| 6,186,167 | B1 * | 2/2001 | Grumstrup | F16K 37/0083 137/456 |
| 6,862,547 | B2 | 3/2005 | Snowbarger et al. | |
| 6,920,409 | B2 | 7/2005 | Essam | |
| 6,954,683 | B2 | 10/2005 | Junk et al. | |
| 7,464,721 | B2 | 12/2008 | Perry et al. | |
| 7,609,056 | B2 | 10/2009 | Junk et al. | |
| 7,621,293 | B2 | 11/2009 | Snowbarger | |
| 7,925,386 | B2 * | 4/2011 | Krippner | G05D 7/0635 137/486 |
| 8,074,512 | B2 | 12/2011 | Al-Buaijan | |
| 8,104,495 | B2 | 1/2012 | Snowbarger | |
| 8,479,734 | B2 * | 7/2013 | Wood | A61G 10/026 128/202.12 |
| 8,540,211 | B2 | 9/2013 | Wheater et al. | |
| 8,684,021 | B2 | 4/2014 | Snowbarger | |
| 8,725,434 | B2 | 5/2014 | Flanders | |
| 8,996,328 | B2 | 3/2015 | Snowbarger | |
| 9,046,185 | B2 * | 6/2015 | Kiesbauer | F16K 37/0091 |
| 9,255,649 | B2 * | 2/2016 | Coleman | G05B 9/02 |
| 9,551,434 | B1 | 1/2017 | Hung | |
| 9,611,873 | B2 | 4/2017 | Junk | |
| 9,752,599 | B2 | 9/2017 | Junk | |
| 9,874,870 | B2 * | 1/2018 | Law | G06F 11/3636 |
| 10,041,610 | B2 * | 8/2018 | Junk | F16K 37/0091 |
| 2002/0108436 | A1 | 8/2002 | Albuaijan | |
| 2003/0062494 | A1 * | 4/2003 | Snowbarger | G05B 9/02 251/89 |
| 2005/0016254 | A1 | 1/2005 | Brown | |
| 2006/0219299 | A1 | 10/2006 | Snowbarger | |
| 2007/0018127 | A1 | 1/2007 | Seberger | |
| 2007/0183901 | A1 * | 8/2007 | Chester | F15B 5/006 417/26 |
| 2009/0199703 | A1 * | 8/2009 | Hoffmann | F15B 11/028 91/361 |
| 2010/0315069 | A1 | 12/2010 | Heer et al. | |
| 2011/0114191 | A1 | 5/2011 | Wheater et al. | |
| 2011/0252895 | A1 | 10/2011 | Kiesbauer et al. | |
| 2012/0310582 | A1 | 12/2012 | Al-Buaijan | |
| 2013/0000753 | A1 * | 1/2013 | Penning | F15B 19/002 137/487.5 |
| 2013/0119285 | A1 | 5/2013 | Al-Buaijan | |
| 2014/0102549 | A1 * | 4/2014 | Okuda | F15B 5/006 137/82 |
| 2015/0323936 | A1 | 11/2015 | Junk | |
| 2016/0098044 | A1 | 4/2016 | Junk et al. | |
| 2016/0273676 | A1 | 9/2016 | Junk | |
| 2016/0274598 | A1 | 9/2016 | Junk | |
| 2016/0356396 | A1 * | 12/2016 | Kah | F16K 31/42 |
| 2017/0184215 | A1 | 6/2017 | Junk | |
| 2017/0198829 | A1 | 7/2017 | Alkandari | |
| 2017/0350421 | A1 | 12/2017 | Gagné | |
| 2018/0112796 | A1 | 4/2018 | Junk et al. | |
| 2018/0112798 | A1 | 4/2018 | Junk et al. | |

OTHER PUBLICATIONS

Norgren, "Emergency Shut-Down Solutions—Process Safety, Reliability, & Efficiency," IMI Norgren Co., Ltd. 2008, 4 pages.
IMI Precision Engineering, "IC04-PST Solenoid Valve—The Smart Solenoid for Integrated Partial Stroke Testing," Norgren Limited, 2015, 8 pages.
IMI Precision Engineering, "IC04-PST Frequently Asked Questions" Version 2, Jul. 2015, 6 pages.
International Searching Authority, "International Search Report and Written Opinion," issued in connection with International Patent Application No. PCT/US2017/055124, dated Feb. 8, 2018, 12 pages.
United States Patent and Trademark Office, "Notice of Allowance and Fee(s) Due," issued in connection with U.S. Appl. No. 15/298,717, dated May 1, 2018, 10 pages.
United States Patent and Trademark Office, "Non-Final Office Action," issued in connection with U.S. Appl. No. 15/298,731, dated Aug. 27, 2018, 12 pages.
United States Patent and Trademark Office, "Notice of Allowance and Fee(s) Due," issued in connection with U.S. Appl. No. 15/298,731, dated Jan. 8, 2019, 7 pages.

* cited by examiner

METHODS AND APPARATUS OF ASSESSING A TEST OF A SOLENOID VALVE VIA A POSITIONER

CROSS-REFERENCE TO RELATED APPLICATIONS

This patent relates to subject matter disclosed in a U.S. patent application entitled "Methods and Apparatus of Testing a Solenoid Valve of an Emergency Valve via a Positioner" 15/298,731 and a U.S. patent application entitled "Methods and Apparatus of Stabilizing a Valve Positioner When Testing a Solenoid Valve" 15/298,717, both of which were filed on Oct. 20, 2016 and are incorporated herein by reference in their entireties.

FIELD OF THE DISCLOSURE

This patent relates generally to solenoid valves and, more particularly, to methods and apparatus of assessing a test of a solenoid valve via a positioner.

BACKGROUND

Emergency valves (e.g., shutdown valves, vent valves) oftentimes are used in environments (e.g., within the oil and gas industry) to protect people, equipment and/or the environment in dangerous conditions. For example, an emergency shutdown valve may be actuated (e.g., closed) to stop flow of hazardous material upon detection of a dangerous condition. In some instances, tests are conducted on the emergency valves to verify that the emergency shutdown valves are capable of actuating.

SUMMARY

In one example, an apparatus includes a solenoid valve to enable an actuator to close an emergency valve and a valve positioner fluidly and communicatively coupled to the solenoid valve. The valve positioner is to instruct the solenoid valve for a pulse duration to transition the solenoid valve from a first state to a second state. The pulse duration extends from a start time to a pulse end time. The solenoid valve is to transition from the second state to the first state upon completion of the pulse duration. The valve positioner is to monitor a pressure change of a pressure chamber of the actuator in fluid communication with the solenoid valve relative to an initial pressure for a monitoring duration that extends from the start time to a monitoring end time. The valve positioner is to identify a maximum pressure change during the monitoring duration and determine a ready state of the solenoid valve when the maximum pressure change is greater than a minimum trip value and the pressure change at the monitoring end time is less than a maximum reset value.

In another example, a method includes instructing, by executing first instructions via a processor, a solenoid valve for a pulse duration to transition from a first state to a second state. The solenoid valve is to enable an actuator to close an emergency valve. The pulse duration extends from a start time to a pulse end time. The method includes instructing, by executing second instructions via the processor, the solenoid valve to transition from the second state to the first state at the pulse end time and monitoring, by executing third instructions via the processor, a pressure change of a pressure chamber of the actuator in fluid communication with the solenoid valve relative to an initial pressure for a monitoring duration that extends from the start time to a monitoring end time. The method includes identifying, by executing fourth instructions via the processor, a maximum pressure change during the monitoring duration and determining, by executing fifth instructions via a processor, a ready state of the solenoid valve when the maximum pressure change is greater than a minimum trip value and the pressure change at the monitoring end time is less than a maximum reset value.

In another example, an apparatus includes means for actuating an actuator to close an emergency valve and means for positioning fluidly and communicatively coupled to the means for actuating. The means for positioning is to instruct the means for actuating for a pulse duration to transition the means for actuating from a first state to a second state. The pulse duration extends from a start time to a pulse end time. The means for actuating is to transition from the second state to the first state upon completion of the pulse duration. The means for positioning is to monitor a pressure change of a pressure chamber of the actuator in fluid communication with the means for actuating relative an initial pressure for a monitoring duration that extends from the start time to a monitoring end time. The means for positioning is to identify a maximum pressure change during the monitoring duration and determine a ready state of the means for actuating when the maximum pressure change is greater than a minimum trip value and the pressure change at the monitoring end time is less than a maximum reset value.

DETAILED DESCRIPTION

Figure 1:
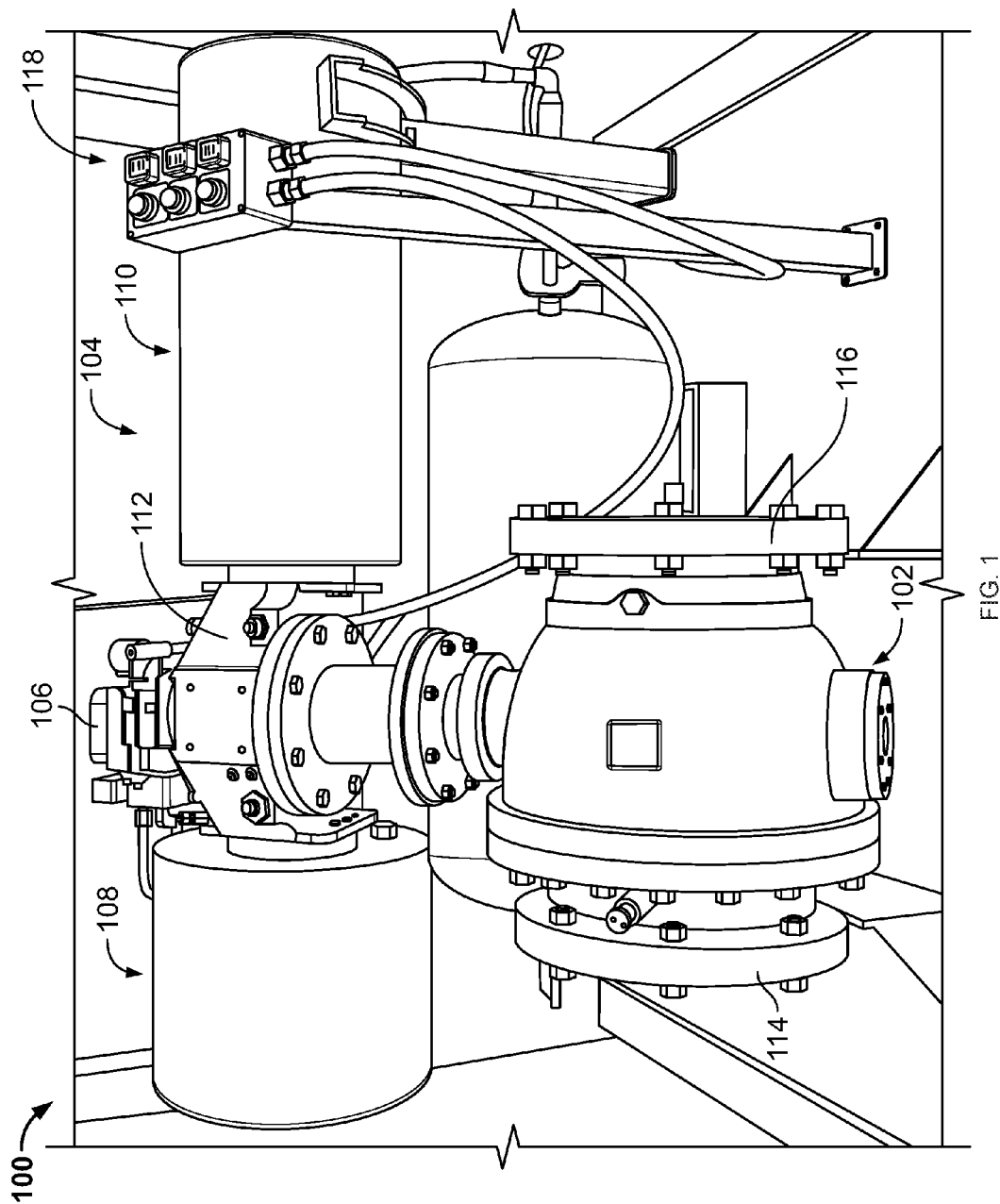
FIG. 1 illustrates an example emergency valve, an example actuator, and an example valve positioner in accordance with the teachings of this disclosure.

The figures are not to scale. Instead, to clarify multiple layers and regions, the thicknesses of the layers may be enlarged in the drawings. Wherever possible, the same reference numbers will be used throughout the drawing(s) and accompanying written description to refer to the same or like parts.

Emergency valves (e.g., shutdown valves, vent valves) are utilized in environments, such as within the oil and gas industry, to protect people, equipment and/or the environment in dangerous conditions. For example, a shutdown valve may be closed upon detection of dangerous condition(s) to stop flow of hazardous material and, thus, reduce risk of harm to the people, equipment and/or environment.

For example, some known shutdown valves are actuated (e.g., closed, opened) via an actuator that is operatively coupled to a solenoid valve in communication with a controller (e.g., a programmable controller, a programmable logic controller, a logic solver, etc.). In some instances, the actuator includes a piston that is disposed in a chamber and operatively coupled to a spring. When pressure within the chamber applies a force to the piston that is greater than a preset load of the spring, the piston prevents the spring and, thus, the actuator from actuating, thereby retaining the shutdown valve in an open position. When the pressure within the chamber falls below the preset load of the spring, the spring causes the piston within the chamber to actuate and, thus, causes the actuator to actuate the shutdown valve from the open position to a closed position. In some instances, the position of the actuator is controlled by the solenoid valve that provides air to and/or removes (e.g., exhausts, vents) air from the chamber. For example, the solenoid valve vents air from the actuator upon receiving an emergency signal from the controller that is in communication with a sensor detecting the existence of the dangerous and/or hazardous condition(s).

In some instances, an environment may not have dangerous and/or hazardous condition(s) for extended periods of time. As a result, the emergency valve, the actuator and/or the solenoid valve may not actuate for an extended period of time. In such instances, the emergency valve, the actuator and/or the solenoid valve may deteriorate and/or become damaged in a manner that causes the emergency valve to fail to actuate (e.g., close for a shutdown valve, open for a vent valve) upon detection of a dangerous and/or hazardous condition. To verify that the emergency valve will actuate upon detection of such conditions, some emergency valves are tested periodically.

Some known emergency valves are tested via a partial stroke test. To conduct a partial stroke test, a positioner is operatively coupled to the actuator so that the position of the actuator and, thus, the emergency valve is controlled by the positioner (not the solenoid valve) during the test. For example, during a partial stroke test of a shutdown valve, the positioner causes the actuator to partially actuate the shutdown valve (e.g., travel a fraction of a full stroke to the closed position such as about between 10% and 15%) from the open position. Because the partial stroke test partially closes the shutdown valve, the partial stroke test interrupts and/or disturbs operation of a system in which the shutdown valve is installed while the partial stroke test is being conducted. As a result, emergency valves oftentimes are tested via a partial stroke test only once every couple of years. Further, because the actuator and the emergency valve are controlled directly by the positioner during a partial stroke test, such tests fail to verify that the solenoid valve has not deteriorated and/or otherwise become damaged over time in such a manner that would prevent the emergency valve from actuating when a hazardous and/or dangerous condition is detected.

Other known emergency valves are tested by tripping the solenoid valve (e.g., by de-energizing the solenoid valve) to cause the emergency valve to partially close (e.g., to a predetermined partially open position). However, such tests may be difficult to control because the solenoid valve has only two control states (e.g., energized and de-energized) that prohibit precise control of the actuator and, thus, precise control of the emergency valve as air is being vented from the actuator. Further, because the pressure in the chamber at the rest position of the actuator corresponds to a force that is typically significantly greater than the preset load of the spring, it is oftentimes difficult to determine how much air must be vented from the chamber before the actuator starts to actuate the emergency valve. Additionally, electrical and/or mechanical delays in the system may make it difficult to determine how long the solenoid valve should actuate the actuator to partially close and/or partially open the emergency valve and/or return the emergency valve to its rest position. As a result of the difficulty in controlling such tests, the emergency valve oftentimes does not actuate, thereby resulting in a false negative (e.g., as a result of the solenoid valve being tripped for too short of a duration of time). In other instances, such tests result in the shutdown valve actuating more than a desired amount (e.g., over-travel such as fully closing a shutdown valve that results from the solenoid valve being tripped for too long of a duration of time), thereby further interrupting and/or disturbing the system in which the emergency valve is implemented. Moreover, because emergency valves oftentimes are tested once every couple of years by tripping the solenoid valve, such tests may not detect a damaged solenoid valve, which oftentimes deteriorate more frequently than the actuator and/or the emergency valve, in a timely manner.

The examples disclosed herein enable a solenoid valve that controls actuation of an emergency valve (e.g., a shutdown valve, a vent valve) to be tested via a positioner and independently of testing the emergency valve. The examples disclosed herein test the solenoid valve without actuating the shutdown valve and, thus, without interrupting and/or disturbing a system in which the shutdown valve is installed. To assess the test of the solenoid valve, the example methods and apparatus disclosed herein compare pressure changes of a pressure chamber of an actuator in fluid communication with the solenoid valve to a minimum trip value and a maximum reset value associated with the solenoid valve in a ready (e.g., functioning, normal, etc.) state.

Examples disclosed herein include a solenoid valve that enables an actuator to actuate an emergency valve (e.g., under hazardous and/or dangerous conditions) to a trip position (e.g., a closed position for a shutdown valve, an open position for a vent valve) and a valve positioner that is fluidly and communicatively coupled to the emergency valve. To test the solenoid valve, the valve positioner instructs the solenoid valve for a pulse duration to transition from a first state (e.g., an energized state, a normal state) to a second state (e.g., a de-energized state, an emergency state, a trip state) for a period of time. For example, the pulse duration extends from a start time to a pulse end time. Upon completion of the pulse duration, the valve positioner is to instruct the solenoid valve to transition from the second state to the first state. The valve positioner monitors a pressure change of a pressure chamber of the actuator that is in fluid communication with the solenoid valve relative to an initial pressure (e.g., measured prior to initiating the solenoid valve to transition to the second state) for a monitoring duration that extends from the start time to a monitoring end time. For example, the monitoring time is greater than or equal to the pulse duration. Further, the valve positioner identifies a maximum pressure change during the monitoring duration.

When the maximum pressure change is greater than a minimum trip value and the pressure change at the monitoring end time is less than a maximum reset value, the valve positioner of the examples disclosed herein determines a ready state in which the solenoid is able to actuate the actuator of the emergency valve. Alternatively, the valve positioner determines an error and/or abnormal state of the solenoid valve when the maximum pressure change is less than the minimum trip value and/or the pressure change at the monitoring end time is greater than the maximum reset value. In examples in which the emergency valve is a shutdown valve, the valve positioner identifying that the maximum pressure change is less than the minimum trip value may indicate that the solenoid is slow to and/or fails to cause the actuator to close the shutdown valve. Additionally or alternatively, the valve positioner identifying that the pressure change at the monitoring end time is greater than the maximum reset value may indicate the solenoid valve is slow to and/or fails to cause the actuator to reopen the shutdown valve upon closing.

The example valve positioner determines the maximum pressure change (e.g., a maximum pressure decrease or drop) by comparing the initial pressure of the pressure chamber of the actuator in fluid communication with the solenoid valve and a minimum pressure measured of the pressure chamber during the monitoring duration. Further, the valve positioner determines the pressure change (e.g., a pressure increase) at the monitoring end time by comparing the initial pressure and a pressure measured of the pressure chamber at the monitoring end time.

In some examples, the valve positioner further determines the ready state of the solenoid valve when the maximum pressure change is greater than the minimum trip value, the pressure change at the monitoring end time is less than the maximum reset value, and the maximum pressure change is less than a maximum trip value. In some examples, the minimum trip value is approximately half the maximum trip value. In some examples, the maximum reset value is approximately twice a nominal pressure change relative to the initial pressure.

The examples disclosed herein enable the valve positioner to test the solenoid valve independently of testing the emergency valve and/or without causing the solenoid valve to actuate the emergency valve. Further, the example valve positioner tests the functionality of the solenoid valve (e.g., determines whether the solenoid valve is in a ready state or an error and/or abnormal state) based on a comparison of the pressure change relative to the initial pressure to account for a varying upstream flow, a varying downstream flow, a delay in communication between the valve positioner and the solenoid valve, and/or a mechanical and/or electrical delay in transitioning the solenoid valve between the first state and the second state.

Turning to the figures, FIG. 1 illustrates an example emergency system 100 as disclosed herein. In the illustrated example, the emergency system 100 includes a shutdown valve 102, an actuator 104, a solenoid valve (e.g., a solenoid valve 202 of FIG. 2), and a valve positioner 106 (e.g., a digital valve controller). The actuator 104 includes a first chamber 108, a second chamber 110, and a drive module housing 112. The first chamber 108 houses a piston (e.g., a piston 510 of FIG. 5) and the second chamber 110 houses a spring (e.g., a spring 514 of FIG. 5) that actuates a shaft (e.g., a shaft 502 of FIG. 5) of the actuator 104 disposed in the drive module housing 112. As illustrated in FIG. 1, the shutdown valve 102 is coupled to the drive module housing 112 of the actuator 104. The shutdown valve 102 includes a valve member (e.g., a ball) that transitions the shutdown valve 102 between an open position and a closed position to control an amount of fluid flowing between a first end 114 and a second end 116 of the shutdown valve 102. The shaft of the actuator 104 is operatively coupled to the valve member of the shutdown valve 102 to enable the actuator 104 to transition the shutdown valve 102 between the open position and the closed position.

In operation, upon detection of a hazardous and/or dangerous environment or condition, the actuator 104 causes the shutdown valve 102 to transition to the closed position. For example, the shutdown valve 102 closes to prevent the fluid (e.g., potentially hazardous material) from flowing when a dangerous condition is detected to increase and/or improve safety of people, equipment and/or the environment. Because hazardous and/or dangerous conditions may not be detected for extended periods of time, the valve positioner 106 of the example emergency system 100 periodically tests the functionality of the shutdown valve 102 and/or the actuator 104 (e.g., via a partial stroke test) to verify that the shutdown valve 102 is capable of closing. For example, the valve positioner 106 periodically conducts a partial stroke test to determine whether the actuator 104 and/or the shutdown valve 102 is damaged and/or otherwise fails to function. Further, in the illustrated example, the emergency system 100 includes a control panel 118 that enables an operator to initiate the valve positioner 106 to test the shutdown valve 102, the actuator 104 and/or the solenoid of the emergency system 100. While the emergency system 100 of the illustrated example includes the shutdown valve 102, the emergency system 100 may alternatively include another type of emergency valve such as a vent valve and/or any other type of valve capable of being actuated via the actuator 104.

Figure 2:
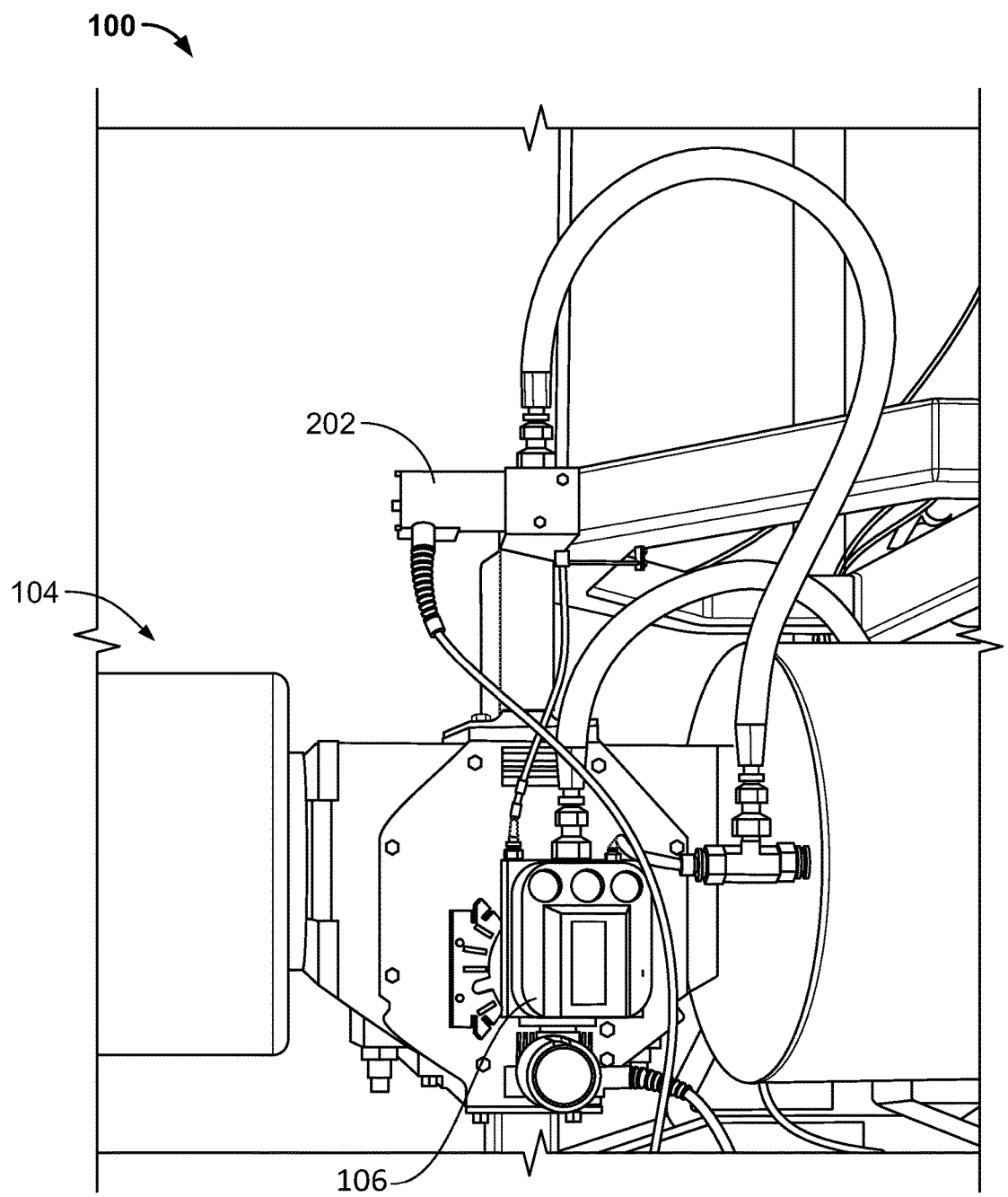
FIG. 2 illustrates the actuator and the valve positioner of FIG. 1 and an example solenoid valve in accordance with the teachings of this disclosure.

FIG. 2 illustrates the valve positioner 106, the solenoid valve 202, and a portion of the actuator 104 of the example emergency system 100. In operation, upon detection of a hazardous and/or dangerous environment, the solenoid valve 202 is de-energized (e.g., power is not supplied to the solenoid valve 202) to cause the solenoid valve 202 to actuate the actuator 104 which, in turn, actuates the shutdown valve 102 (FIG. 1) toward a trip position (e.g., the closed position for the shutdown valve 102). In addition to periodically testing the shutdown valve 102 and/or the actuator 104, the valve positioner 106 of the example emergency system 100 periodically tests the solenoid valve 202 to verify that the solenoid valve 202 will actuate the actuator 104 upon detection of a trip (e.g., hazardous and/or dangerous) condition. For example, the valve positioner 106 conducts a test to determine whether the solenoid valve 202 switches, upon the valve positioner 106 interrupting power provided to the solenoid valve 202, from a first state (e.g., an energized state, a normal state) to a second state (e.g., a de-energized state, an emergency state, a trip state) to actuate the actuator 104.

Figure 3:
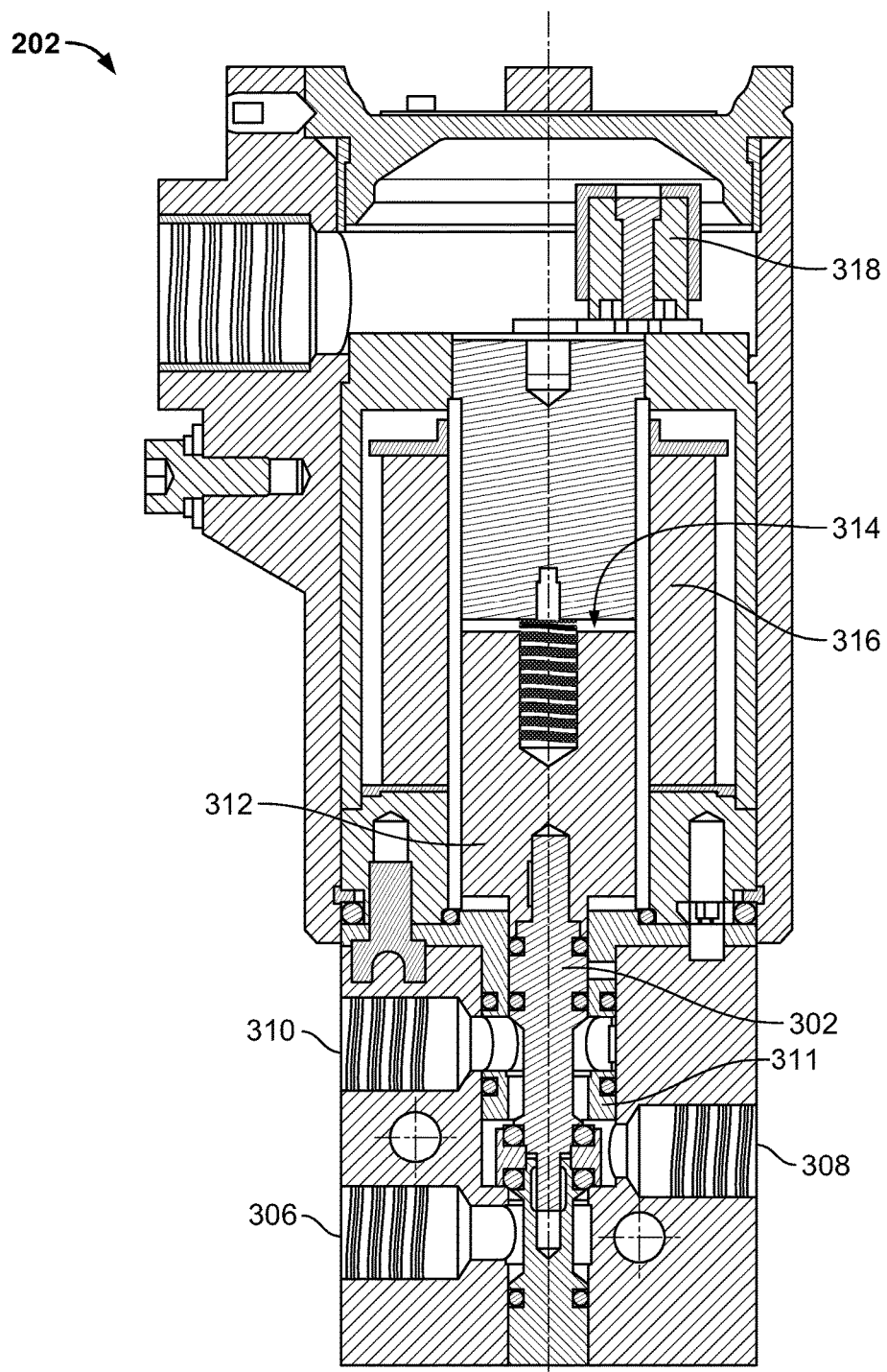
FIG. 3 is a cross-sectional view of the solenoid valve of FIG. 2.

FIG. 3 is a cross-sectional view of the example solenoid valve 202 of the emergency system 100 (FIGS. 1-2). As illustrated in FIG. 3, the solenoid valve 202 is a 3/2-way valve in which a stem 302 actuates to define two alternate fluid paths between three ports. For example, in a first state (e.g., an energized state, a normal state), the stem 302 of the solenoid valve 202 defines a first fluid path between a first valve port 306 and a second valve port 308. To define the first fluid path of the first state, the stem 302 blocks, seals and/or otherwise prevents fluid to flow through a third valve port 310. Further, as illustrated in FIG. 3, the stem 302 may be actuated to transition the solenoid valve 202 to a second state (e.g., a de-energized state, an emergency state, a trip state) in which the stem 302 defines a second fluid path 311 of the solenoid valve 202 between the second and third valve ports 308, 310 by blocking, sealing and/or otherwise preventing fluid to flow through the first valve port 306.

As illustrated in FIG. 3, the stem 302 is coupled to an armature 312 such that movement of the armature 312 along a pathway 314 causes the stem 302 to traverse between the first state and the second state of the solenoid valve 202. In the illustrated example, the armature 312 is at least partially disposed in the pathway 314 formed by a solenoid coil 316 that produces a magnetic field. The armature 312 is composed of magnetic material. As a result, the magnetic field produced by the solenoid coil 316 urges, moves and/or actuates the armature 312 as the solenoid coil 316 transitions between an energized state and a de-energized state to cause the stem 302 to transition between the first state and the second state of the solenoid valve 202. In the illustrated example, the solenoid coil 316 is de-energized and the armature 312 and the stem 302 are positioned in the second state of the solenoid valve 202. When the solenoid coil 316 is energized, the magnetic field produced by the solenoid coil 316 changes, thereby causing the magnetic armature 312 and the stem 302 coupled to the armature 312 to actuate along the pathway 314 to the first state of the solenoid valve 202. To de-energize the solenoid coil 316, the valve positioner 106 interrupts power provided to the solenoid valve 202 for a pulse duration (e.g., a pulse duration 808 of FIGS. 8A-8B) via wiring that is coupled to the solenoid valve 202 via a terminal block 318. For example, the wiring is coupled to the terminal block 318 to communicatively couple the solenoid valve 202 to the valve positioner 106 (FIGS. 1 and 2) that tests the functionality of the solenoid valve 202 and/or to a controller (e.g., a programmable controller, a programmable logic controller, a logic solver, etc.) that detects hazardous and/or dangerous conditions via sensor(s).

Figure 4:
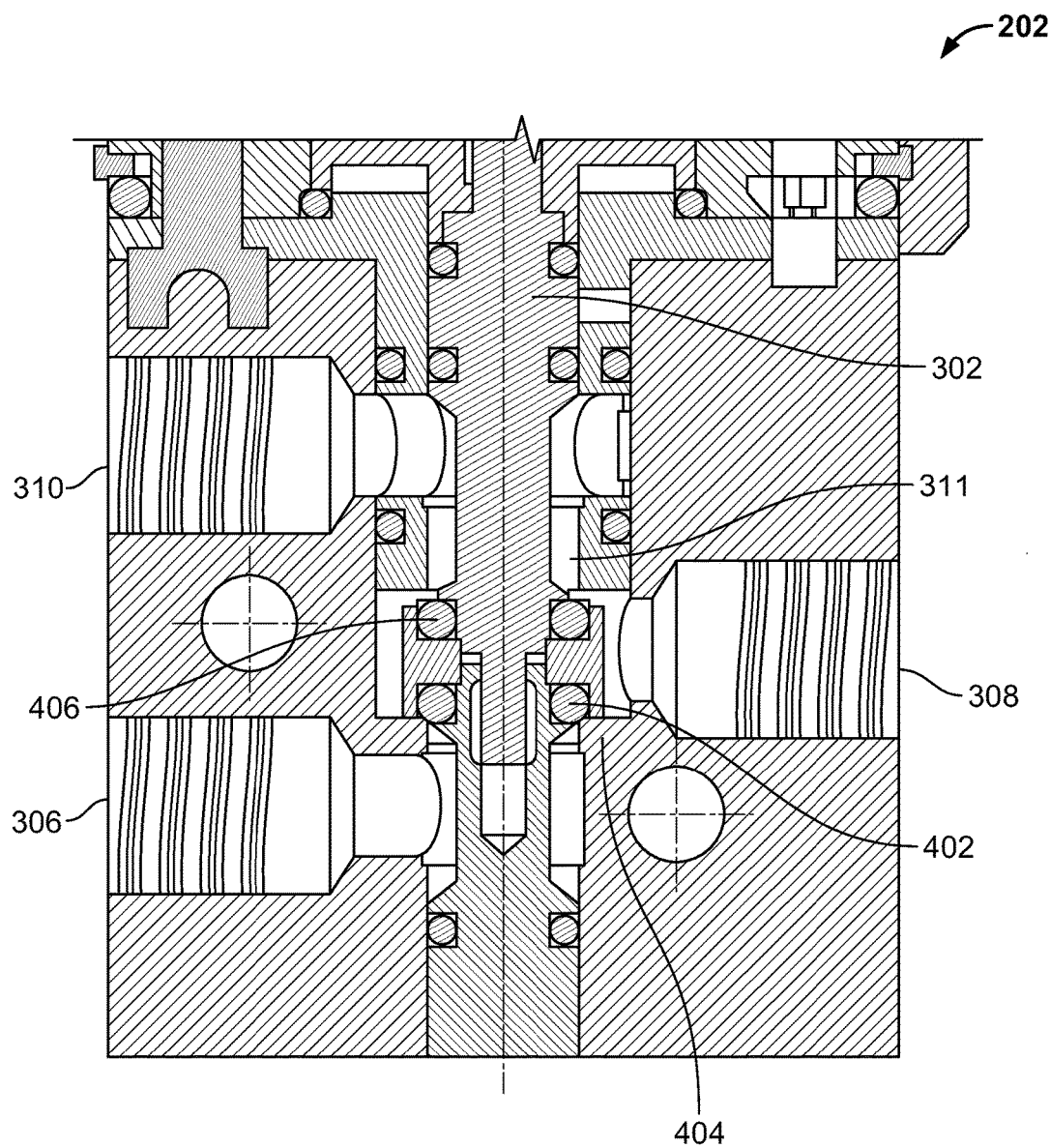
FIG. 4 is an enlarged cross-sectional view of valve ports of the solenoid valve of FIG. 2.

FIG. 4 is an enlarged cross-sectional view of the first, second, and third valve ports 306, 308, 310 and the stem 302 when the solenoid valve 202 is in the second state. In the illustrated example, the stem 302 includes a first seal 402 (e.g., a first o-ring) that engages a body 404 of the solenoid valve 202 adjacent the first valve port 306. The first seal 402 forms a seal with the body 404 of the solenoid valve 202 to prevent the first valve port 306 from being in fluid communication with the third valve port 310 and the second valve port 308 when the solenoid valve 202 is in the second state. Further, the stem 302 does not block the third valve port 310 or the second valve port 308 when the solenoid valve 202 is in the second state to define the second fluid path 311 of the second state.

As illustrated in FIG. 4, the stem 302 includes a second seal 406 (e.g., a second o-ring) that is to engage the body 404 of the solenoid valve 202 adjacent the third valve port 310 when the solenoid valve 202 is in the first state. The second seal 406 forms a seal with the body 404 of the solenoid valve 202 to prevent the third valve port 310 from being in fluid communication with the second valve port 308 or the first valve port 306 in the first state of the solenoid valve 202. Further, the stem 302 does not block the second valve port 308 or the first valve port 306 when the solenoid valve 202 is in the first state to define the first fluid path of the first state.

Figure 5:
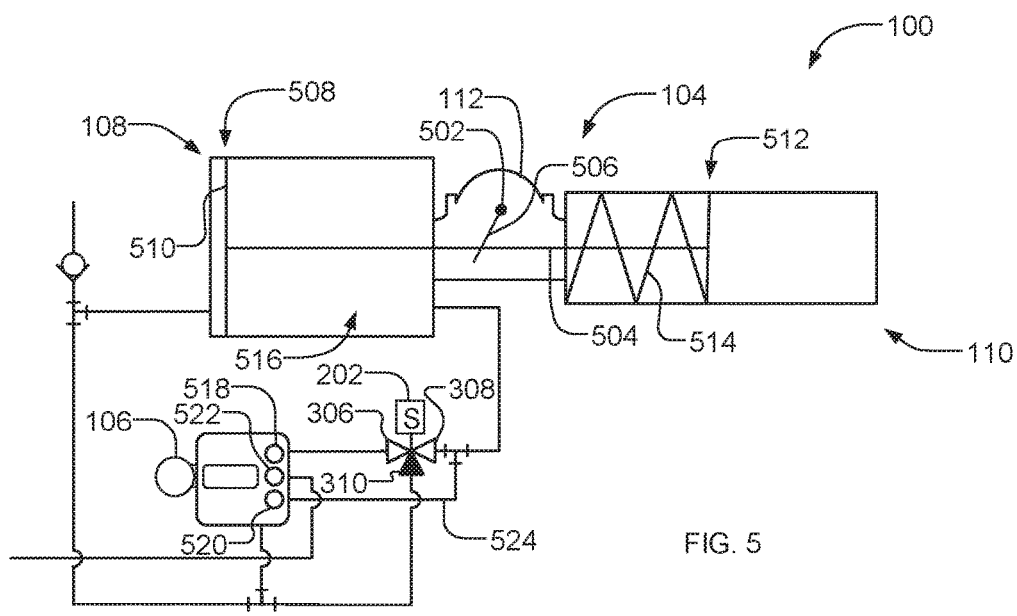
FIG. 5 is a fluid flow schematic of the actuator, the valve positioner, and the solenoid valve of FIGS. 1-2 in a first state in accordance with the teachings of this disclosure.
Figure 6:
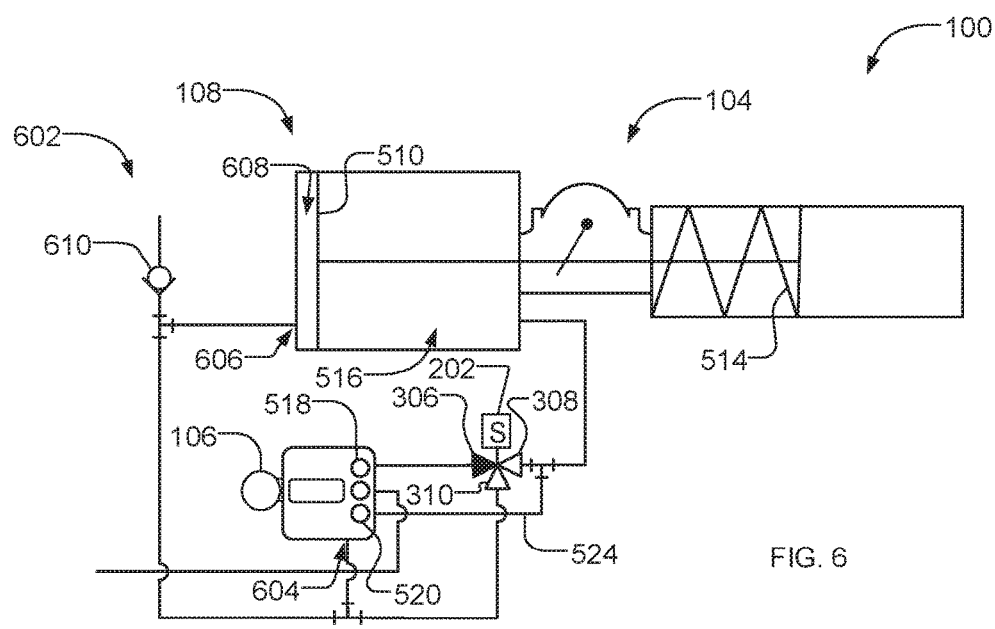
FIG. 6 is a fluid flow schematic of the actuator, the valve positioner, and the solenoid valve of FIGS. 1-2 in a second state in accordance with the teachings of this disclosure.

FIG. 5-6 depict a fluid flow schematic of the example emergency system 100 in which the valve positioner 106 tests the functionality of the solenoid valve 202 independently of testing the functionality of the shutdown valve 102 (FIG. 1) and/or the actuator 104. More specifically, FIG. 5 illustrates the emergency system 100 during testing of the solenoid valve 202 when the solenoid valve 202 is in the first state (e.g., the energized state, the normal state), and FIG. 6 illustrates the emergency system 100 during testing of the solenoid valve 202 when the solenoid valve 202 is in the second state (e.g., the de-energized state, the emergency state, the trip state).

As illustrated in FIG. 5, the actuator 104 includes a shaft 502 that is operatively coupled to the valve member of the shutdown valve 102 to actuate the shutdown valve 102 between the open and closed positions. The shaft 502 is operatively coupled to a stem 504 of the actuator 104 via a yoke mechanism 506 disposed in the drive module housing 112. A first end 508 of the stem 504 extends into the first chamber 108 of the actuator 104 and couples to a piston 510 disposed in the first chamber 108, and a second end 512 of the stem 504 extends into the second chamber 110 and couples to a spring 514 disposed in the second chamber 110.

In FIG. 5, the actuator 104 is in a rest position that corresponds to the open position of the shutdown valve 102. For example, the spring 514 is preloaded such that the spring 514 is compressed within the second chamber 110. Further, pressure within a pressure chamber 516 of the first chamber 108 exerts a force on the piston 510 in a first direction (e.g., to the left in the illustrated example) that is substantially greater than a force (e.g., a preload) exerted by the spring 514 onto the second end 512 of the stem 504 in an opposing direction (e.g., to the right in the illustrated example). The actuator 104 remains in the rest position until the force applied by the spring 514 overcomes the force applied by the pressure in the pressure chamber 516. For example, upon detection of a hazardous and/or dangerous condition, the pressure chamber 516 may be vented for a period of time to substantially reduce the pressure within the pressure chamber 516. In such instances, the actuator 104 begins to close the shutdown valve 102 only when the force applied to the piston 510 becomes less than the force applied by the spring 514.

Further, as illustrated in FIG. 5, the actuator 104, the valve positioner 106, and the solenoid valve 202 of the example emergency system 100 are fluidly coupled together. The valve positioner 106 includes a first pressure port 518, a second pressure port 520, and a third pressure port 522. The third pressure port 522 receives supply fluid (e.g., unregulated plant air) that is provided to the first pressure port 518, the first pressure port 518 is in fluid communication with the first valve port 306 of the solenoid valve 202, and the second pressure port 520 is in fluid communication with the second valve port 308 of the solenoid valve 202 and the pressure chamber 516 of the actuator 104 via a sense line 524. Further, the third valve port 310 is in fluid communication with a vent.

In FIG. 5, the solenoid valve 202 is in the first state in which the third valve port 310 is closed to form the first fluid path between the first valve port 306 and the second valve port 308. As a result, the pressure chamber 516 of the actuator 104 is in fluid communication with and receives fluid from the first pressure port 518 of the valve positioner 106. For example, the fluid provided by the first pressure port 518 causes the pressure chamber 516 to produce a first pressure in the pressure chamber 516 when the solenoid valve 202 is in the first state. The first pressure of the pressure chamber 516 applies a first force to the piston 510 that is greater than a preload of the actuator 104 (e.g., provided by the spring 514), thereby enabling the actuator 104 to remain in the rest position when the solenoid valve 202 is in the first state.

Further, the valve positioner 106 tests the functionality of the solenoid valve 202 by determining whether the solenoid valve 202 transitions between the first state (FIG. 5) and the second state (FIG. 6) when the valve positioner 106 interrupts power provided to the solenoid valve 202. For example, the valve positioner 106 may detect an error if the stem 302 (FIGS. 3 and 4) does not move and/or moves too slowly to transition the solenoid valve 202 from the first state to the second state upon power interruption from the valve positioner 106. Further, the valve positioner 106 detects whether the solenoid valve 202 transitions from the first state to the second state by determining whether and to what extent the power interruption causes a change in pressure across the solenoid valve 202. Because the force applied to the piston 510 is substantially greater than the force applied by the spring 514 when the solenoid valve 202 of the example emergency system 100 is in the first state, the valve positioner 106 is able to verify the functionality of the solenoid valve 202 by inducing and measuring a relatively small decrease and/or increase in pressure without affecting the position of the actuator 104 and/or the shutdown valve 102 (e.g., without closing the shutdown valve 102).

To detect a change in pressure (e.g., a pressure change 802 of FIGS. 8A-8B) of the pressure chamber 516 of the actuator 104, the second pressure port 520 of the valve positioner 106 measures a pressure of the pressure chamber 516 via the sense line 524. The valve positioner 106 measures, via the sense line 524, the pressure of the pressure chamber 524 for a predetermined monitoring duration (e.g., a monitoring duration 812 of FIGS. 8A-8B). For example, the valve positioner 106 measures an initial pressure (e.g., an initial pressure 814 of FIG. 8A) associated with the first state of the solenoid valve 202 at the start of the monitoring time. Further, beginning at a start time (e.g., a start time 806 of FIG. 8A), the valve positioner 106 instructs (e.g., by interrupting power provided to) the solenoid valve 202 for a predetermined pulse duration (e.g., the pulse duration 808 of FIGS. 8A-8B) to transition to the second state. Thus, the valve positioner 106 monitors the pressure of the pressure chamber 516 as the solenoid valve 202 is instructed to transition from the first state to the second state.

FIG. 6 depicts the example emergency system 100 when the solenoid valve 202 is in the second state. As illustrated in FIG. 6, the first valve port 306 is closed in the second state, thereby forming the second fluid path 311 (FIGS. 3-4) between the second valve port 308 and the third valve port 310 of the solenoid valve 202. Thus, when the solenoid valve 202 is in the second state, the solenoid valve 202 enables fluid to be vented from the pressure chamber 516, through the second fluid path 311 of the solenoid valve 202, and to the vent. As a result, the pressure measured by the second pressure port 520 in the illustrated example decreases over time when the solenoid valve 202 is in the second state relative to when the solenoid valve 202 is in the first state.

The solenoid valve 202 is instructed to be in the second state (e.g., by interrupting power) from the start time to a pulse end time (e.g., a pulse end time 810 of FIG. 8A) of the pulse duration. Further, the second pressure port 520 of the valve positioner 106 measures (e.g., continuously monitors via the sense line 524) the pressure of the pressure chamber 516 for the monitoring duration that ends at a monitoring end time (e.g., a monitoring end time 816 of FIG. 8A). To test the functionality of the solenoid valve 202, the valve positioner 106 identifies a maximum pressure change (e.g., a maximum pressure change 820 of FIGS. 8A-8B) during the monitoring duration relative to the initial pressure measured at the start time. For example, because the solenoid valve 202 vents the pressure chamber 516 in fluid communication with the second pressure port 520 in the second state, the maximum pressure change is equivalent to a maximum decrease in pressure during the monitoring time. To determine whether the solenoid valve is in a ready state or an error and/or abnormal state, the valve positioner 106 compares (e.g., calculates a difference between) the measured maximum pressure change and a minimum trip value (e.g., a minimum trip value 822 of FIGS. 8A-8B). If the maximum pressure change is less than the minimum trip value, the valve positioner 106 determines that the solenoid valve 202 is in the error and/or abnormal state. For example, the solenoid valve 202 is in the error and/or abnormal state if the solenoid valve 202 does not transition and/or transitions too slowly to the second state to safely close the shutdown valve 102 in an emergency. Further, the valve positioner 106 may identify that the solenoid valve 202 is in the ready state (e.g., is functioning properly) if the maximum pressure change is greater than the minimum trip value, which indicates that the solenoid valve 202 is able to transition to the second state quickly enough to safely close the shutdown valve 102 in an emergency and/or demand situation.

The example valve positioner 106 further tests the functionality of the solenoid valve 202 by instructing the solenoid valve 202 to return to the first state upon completion of the pulse duration. For example, the valve positioner 106 continues to monitor the pressure change upon completion of the pulse duration, because the monitoring duration is greater than the pulse duration (e.g., by permitting power to be supplied to the solenoid valve 202). To further determine whether the solenoid valve 202 is in the ready state or the error and/or abnormal state, the valve positioner 106 compares (e.g., calculates a difference between) the pressure change at the monitoring end time (e.g., a pressure change 824 at the monitoring end time 816 of FIG. 8A) and a maximum reset value (e.g., a maximum reset value 826 of FIG. 8A). The valve positioner 106 determines the pressure change at the monitoring end time by comparing the initial pressure to a pressure of the pressure chamber 516 of the actuator 104 at the monitoring end time. If the pressure change at the monitoring end time is greater than a maximum reset value, the valve positioner 106 determines that the solenoid valve is in the error and/or abnormal state. For example, the pressure change at the monitoring end time being greater than a maximum reset value indicates that the solenoid valve 202 fails to reset and/or resets too slowly to the first state upon completion of the pulse signal. The valve positioner 106 determines that the solenoid valve 202 is in the ready state if the pressure change at the monitoring end time is less than the maximum reset value and the maximum pressure change is greater than the minimum trip value. By determining whether the solenoid valve 202 is in the ready state based on a comparison of the pressure change relative to the initial pressure, the valve positioner 106 is able to accurately test the functionality of the solenoid valve 202 when there is a varying or fluctuating upstream flow, a varying or fluctuating downstream flow, a delay in communication between the valve positioner 106 and the solenoid valve 202 and/or a mechanical and/or electrical delay in transitioning the stem 302 (FIGS. 3 and 4) of the solenoid valve 202 between the first state and the second state.

Further, in the illustrated example, the emergency system 100 incorporates a rebreather system 602 in which the third valve port 310 of the solenoid valve 202, a vent 604 of the valve positioner 106, and a vent 606 of a secondary chamber 608 of the first chamber 108 of the actuator 104 are vented through a check valve 610. The vent 606 of the first chamber 108 prevents a vacuum from forming in the secondary chamber 608 as the piston 510 moves within the first chamber 108 (e.g., in a rightward direction in the illustrated example) to further enable movement of the piston 510 when the pressure within the pressure chamber 516 changes. To prevent the secondary chamber 608 from drawing in polluted air and/or chemicals from the atmosphere, the rebreather system 602 enables the secondary chamber 608 to pull in substantially clean air from the vent 604 of the valve positioner 106 and/or the third valve port 310 of the solenoid valve 202. Further, the check valve 610 maintains a pressure (e.g., approximately 1 pound per square inch) within the rebreather system 602 to enable the secondary chamber 608 to draw the vented air from the vent 604 of the valve positioner 106 and/or the third valve port 310 of the solenoid valve 202. Thus, the valve positioner 106 is capable of testing the functionality of the solenoid valve 202 when the rebreather system 602 is incorporated into the emergency system 100. Additionally or alternatively, the valve positioner 106 is capable of testing the functionality of the solenoid valve 202 when no rebreather system is incorporated into the emergency system 100.

Figure 7:
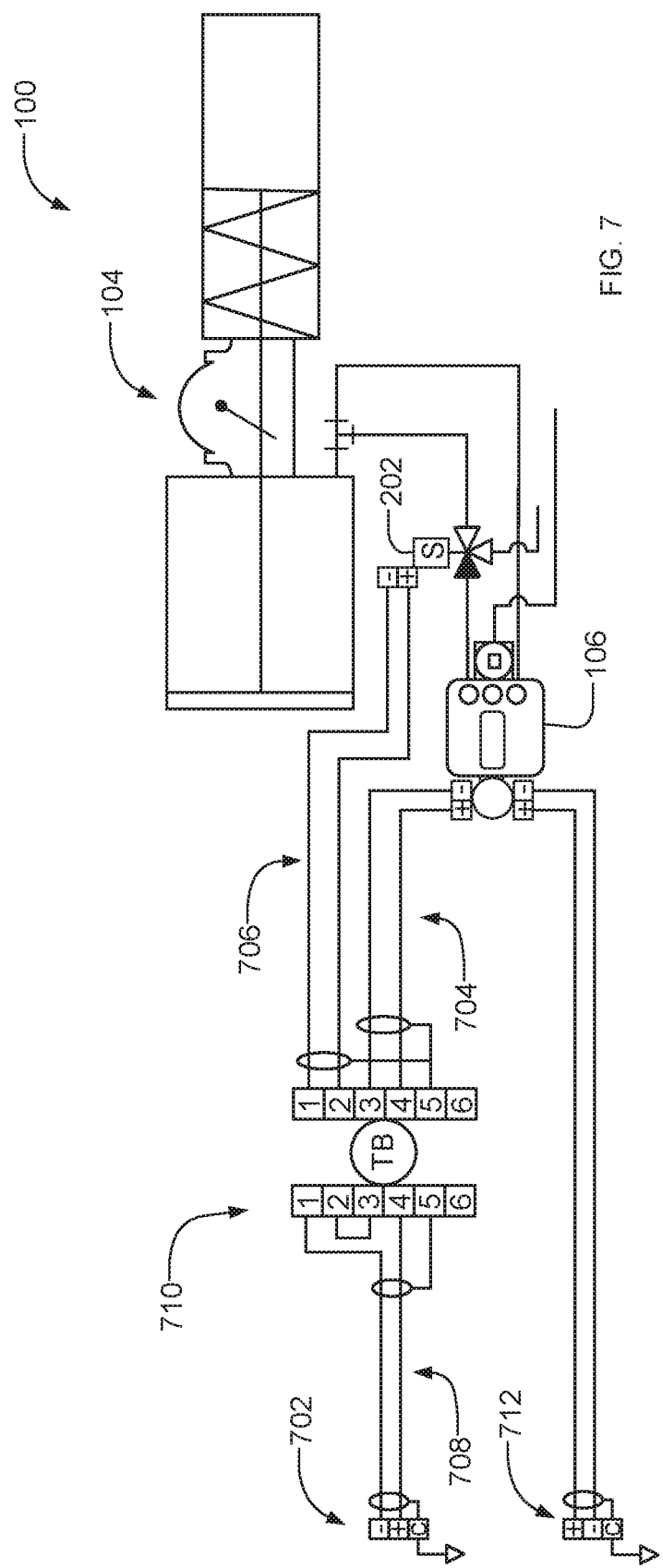
FIG. 7 is an electrical and fluid flow schematic of the actuator, the valve positioner, and the solenoid valve of FIGS. 1-2 in accordance with the teachings of this disclosure.

FIG. 7 depicts an electrical and fluid flow schematic of the emergency system 100 in accordance with the teachings herein when the solenoid valve 202 is in the second state. As illustrated in FIG. 7, the solenoid valve 202 is communicatively coupled to the valve positioner 106 and a first output source 702 via wiring 704, 706, 708. For example, to communicatively couple the solenoid valve 202 and the valve positioner 106, the wiring 704 couples the valve positioner 106 to a terminal block 710 and the wiring 706 couples the terminal block 710 to the solenoid valve 202. Thus, the wiring 704, 706 enables the valve positioner 106 to interrupt and permit power to be provided to the solenoid valve 202 to test the functionality of the solenoid valve 202. Further, the wiring 708 couples the first output source 702 to the terminal block 710 to communicatively couple the first output source 702 to the solenoid valve 202. In some examples, the first output source 702 is an output terminal of a controller (e.g., a programmable controller, a programmable logic controller, a logic solver, etc.) that supplies and/or provides power (e.g., via a +24 VDC signal) to the solenoid valve 202 to open the shutdown valve 102 (FIG. 1) and/or terminates power (e.g., via a 0 VDC signal) to close the shutdown valve 102 upon detection of a hazardous and/or dangerous condition. Thus, as illustrated in FIG. 7, the valve positioner 106 is installed to test the solenoid valve 202 without affecting an ability of the solenoid valve 202 to close the shutdown valve 102 upon detection of a hazardous and/or dangerous condition.

As illustrated in FIG. 7, the valve positioner 106 is communicatively coupled to a second output source 712 that sends an input signal (e.g., a 4-20 mA signal) to the valve positioner 106 to control the valve positioner 106. Further, the output source 712 sends a test signal (e.g., via HART communication protocol, PROFIBUS PA, FOUNDATION Fieldbus, etc.) to start a test (e.g., a partial stroke test) of the solenoid valve 202, the actuator 104 and/or the shutdown valve 102. Thus, the valve positioner 106 of the illustrated example tests the functionality of the solenoid valve 202 independently of testing the functionality of the shutdown valve 102 and/or the actuator 104. In some instances, the solenoid valve 202 may be more likely to deteriorate and/or become damaged over time relative to the actuator 104 and/or the shutdown valve 102. In such instances, the valve positioner 106 conducts a test of the solenoid valve 202 more frequently (e.g., monthly) than it may conduct a partial stroke test of the shutdown valve 102 (e.g., quarterly, yearly, etc.). Further, in some examples, the valve positioner 106 is scheduled (e.g., programmed) to conduct a partial stroke test of the shutdown valve 102 upon testing the functionality of the solenoid valve 202. In such examples, if the valve positioner 106 identifies an error with and/or a malfunction of the solenoid valve 202, the valve positioner 106 may be programmed to and/or enable an operator to elect to abort or continue with the scheduled partial stroke test.

Figure 8A:
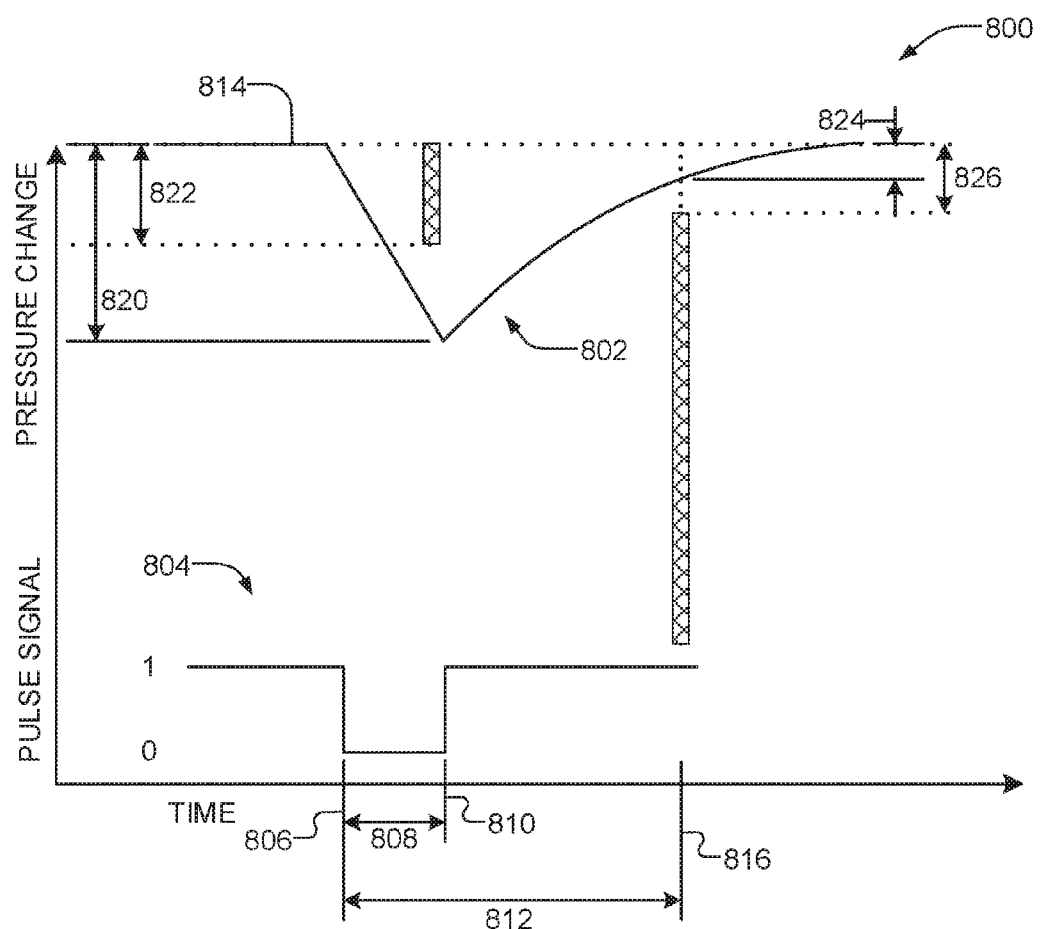
FIG. 8A is a graph depicting an example assessment of a test of the solenoid valve of FIGS. 2-7 conducted via the valve positioner of FIGS. 1-2 and 5-7 in accordance with the teachings herein.

FIG. 8A is a graph 800 depicting an example assessment of a test of the solenoid valve 202 (FIGS. 2-7) conducted via the valve positioner 106 (FIGS. 1-2 and 5-7) in which the solenoid valve 202 is in a ready state. In the illustrated example, a pressure change 802 in the pressure chamber 516 (FIGS. 5-6) of the actuator 104 (FIGS. 1-2 and 5-6) and a pulse signal 804 are plotted in relation to time.

As illustrated in FIG. 8A, the pulse signal 804 is sent to transition the solenoid valve 202 from the first state (e.g., an energized state indicated by the value '1' in FIG. 8A) to the second state (e.g., a de-energized state indicated by the value '0' in FIG. 8A). The pulse signal 804 is sent at the start time 806 and lasts for the pulse duration 808 until the pulse end time 810. Further, the valve positioner 106 monitors the pressure across the solenoid valve 202 for the monitoring duration 812. In the illustrated example, the monitoring duration 812 starts at the start time 806 of the pulse duration 808. For example, the valve positioner 106 measures the initial pressure 814 at the start time 806. In other examples, the monitoring duration 812 may start before the start time 806 of the pulse signal 804 such that the initial pressure 814 is measured before the pulse signal 804 is sent. Further, the monitoring duration 812 extends to the monitoring end time 816. The monitoring duration 812 is greater than the pulse duration 808 such that valve positioner 106 continues to monitor the pressure across solenoid valve 202 after the pulse signal 804 has terminated.

The graph 800 plots the pressure change 802 measured by the valve positioner 106 over time relative to when the valve positioner 106 sends the pulse signal 804 to the solenoid valve 202. For example, the valve positioner 106 determines and/or calculates the pressure change 802 by comparing a measurement of the pressure of the pressure chamber 516 at a particular time to the initial pressure 814. As illustrated in FIG. 8A, the valve positioner 106 measures a decrease in pressure upon the valve positioner 106 sending the pulse signal 804 to the solenoid valve 202 and an increase in pressure upon the valve positioner 106 terminating the pulse signal 804. In the illustrated example, the pressure of the pressure chamber 516 begins to decrease approximately at the start time 806 of the pulse signal 804. In other examples, the pressure begins to decrease after the start time 806 due to a delay in communication between the valve positioner 106 and the solenoid valve 202 and/or due to a mechanical and/or electrical delay of the solenoid valve 202 (e.g., a delay in the stem 302 of FIGS. 3 and 4 moving from the first state to the second state). Further, in the illustrated example, the maximum pressure change 820 of the solenoid valve 202 occurs approximately at the pulse end time 810 of the pulse signal 804. In other examples, the maximum pressure change 820 occurs after the pulse signal 804 ends due to a communicative, electrical and/or mechanical delay. For example, an operational delay associated with a shutdown valve may result in the shutdown valve venting for a period of time ending slightly beyond the pulse end time 810 of the pulse signal 804. In such an example, the maximum pressure change 820 may occur at a time corresponding to the end of the venting period of the shutdown valve, as opposed to occurring at the pulse end time 810 of the pulse signal 804. The maximum pressure change 820 may occur at any point in time during the monitoring duration 812 described above.

The graph 800 of the illustrated example of FIG. 8A depicts the pressure change 802 of the solenoid valve 202 that is in a ready state. The graph 800 of FIG. 8A includes an example minimum trip value 822 (e.g., a minimum trip threshold) and an example maximum reset value 826 (e.g., a maximum reset threshold). The minimum trip value 822 corresponds to a minimum pressure change that is to be exceeded at a point in time during the monitoring duration 812 in order for the solenoid valve 202 to be determined to be in a ready state. The maximum reset value 826 corresponds to a maximum pressure change that is not to be exceeded at the monitoring end time 816 of the monitoring duration 812 in order for the solenoid valve 202 to be determined to be in a ready state. For example, the maximum reset value may be exceeded in instances where the measured pressure of the solenoid valve 202 has not sufficiently returned to the initial pressure 814 by the monitoring end time 816 of the monitoring duration 812. In some examples, the maximum reset value 826 (e.g., the maximum reset threshold) may be set to a value that is approximately twice the value of a nominal pressure change relative to the initial pressure 814. In the illustrated example of FIG. 8A, the solenoid valve 202 is determined to be in a ready state as the maximum pressure change 820 is greater than the minimum trip value 822 and the pressure change 824 at the monitoring end time 816 is less than the maximum reset value 826.

Figure 8B:
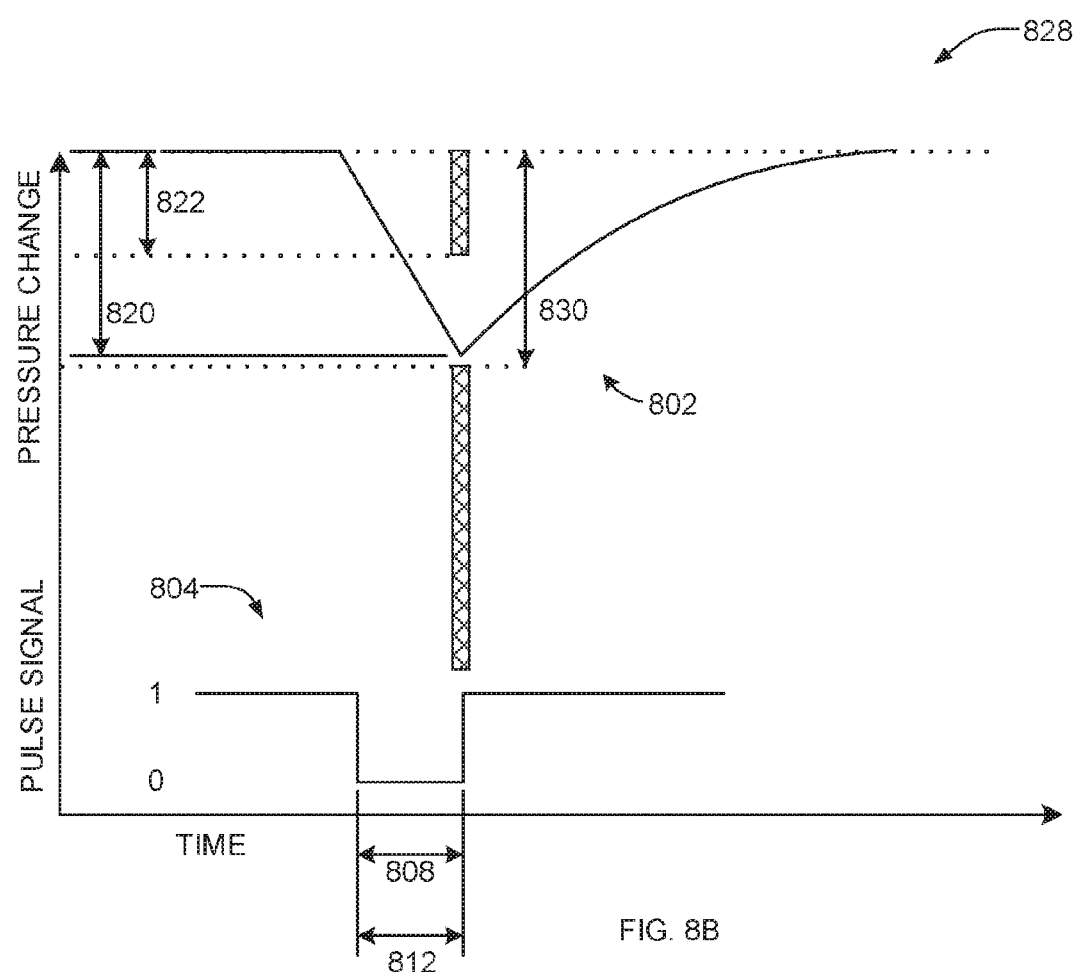
FIG. 8B is a graph depicting another example assessment of a test of the solenoid valve of FIGS. 2-7 conducted via the valve positioner of FIGS. 1-2 and 5-7 in accordance with the teachings herein.

FIG. 8B is a graph 828 depicting another example assessment of a test of the solenoid valve 202 (FIGS. 2-7) conducted via the valve positioner 106 (FIGS. 1-2 and 5-7) in which the solenoid valve 202 is in a ready state. The pressure change 802 in the pressure chamber 516 (FIGS. 5-6) of the actuator 104 (FIGS. 1-2 and 5-6) and the pulse signal 804 are plotted in relation to time. The graph 828 plots the pressure change 802 measured by the valve positioner 106 over time relative to when the valve positioner 106 sends the pulse signal 804 to the solenoid valve 202. In the illustrated example, the pulse duration 808 and the monitoring duration 812 are substantially equal. In other examples, the monitoring duration 812 may be greater than the pulse duration 808.

The example graph 828 depicts the pressure change 802 of the solenoid valve 202 that is in the ready state. The graph 828 of FIG. 8B includes an example minimum trip value 822 (e.g., a minimum trip threshold) and an example maximum trip value 830 (e.g., a maximum trip threshold). The minimum trip value 822 corresponds to a minimum pressure change that is to be exceeded at a point in time during the monitoring duration 812 in order for the solenoid valve 202 to be determined to be in a ready state. The maximum trip value 830 corresponds to a maximum pressure change that is not to be exceeded at any point in time during the monitoring duration 812 in order for the solenoid valve 202 to be determined to be in a ready state. For example, the maximum trip value 830 may be exceeded in instances where too much venting has occurred during the monitoring duration 812. In some examples, the minimum trip value 822 (e.g., the minimum trip threshold) may be set to a value that is approximately half of the value to which the maximum trip value 830 (e.g., the maximum trip threshold) is set. In the illustrated example of FIG. 8B, the solenoid valve 202 is determined to be in a ready state as the maximum pressure change 820 measured by the valve positioner 106 is greater than the minimum trip value 822 and is less than the maximum trip value 830. If the maximum pressure change 820 is less than the minimum trip value 822 or greater than the maximum trip value 830, the valve positioner 106 determines that the solenoid valve 202 is in the error and/or abnormal state.

Figure 9:
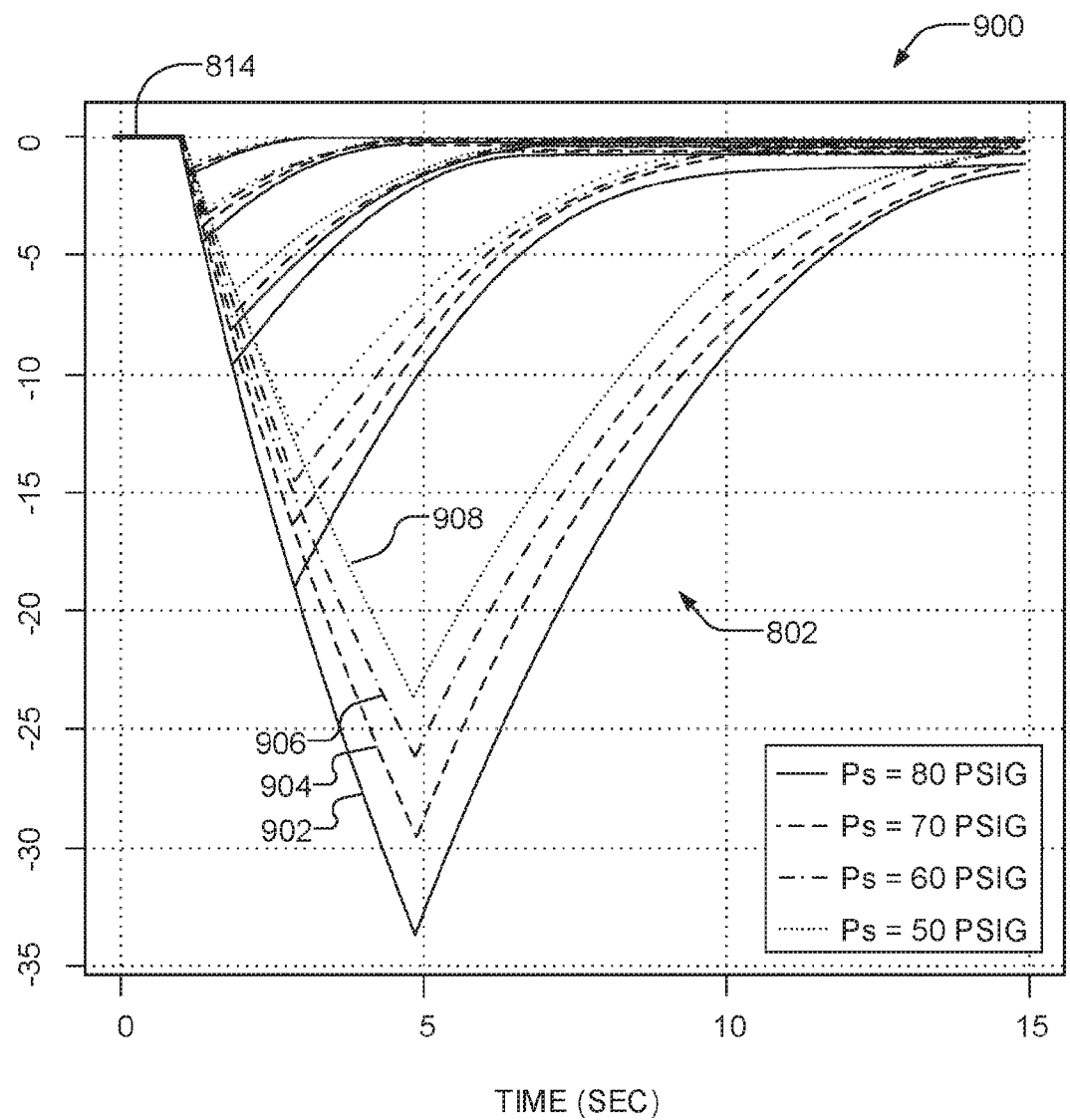
FIG. 9 is a graph depicting example measurements taken to assess the solenoid valve of FIGS. 2-7 via the valve positioner of FIGS. 1-2 and 5-7.

FIG. 9 is a graph 900 depicting example pressure change measurements taken by the valve positioner 106 (FIGS. 1-2 and 5-7) to assess the functionality of the solenoid valve 202 (FIGS. 2-7). For example, the graph 900 includes a first set of lines 902 that corresponds to when the initial pressure 814 (FIGS. 8A-8B) is 80 pounds per square inch, a second set of lines 904 that corresponds to when the initial pressure 814 is 70 pounds per square inch, a third set of lines 906 that corresponds to when the initial pressure 814 is 60 pounds per square inch, and a fourth set of lines 908 that corresponds to when the initial pressure 814 is 50 pounds per square inch. In the illustrated example, the initial pressure 814 for each of the sets of lines 902, 904, 906, 908 is normalized to equal '0.' Further, the graph 900 illustrates the pressure change 802 for different pulse durations (e.g., 0.25 seconds, 0.5 seconds, 1 second, 2 seconds, 4 seconds). Thus, the measurements of the graph 900 (e.g., the maximum pressure changes) may be utilized when determining the minimum trip value 822 (FIGS. 8A-8B), the maximum reset value 826 (FIG. 8A) and/or the maximum trip value 830 when assessing the functionality of the solenoid valve 202.

Figure 10:
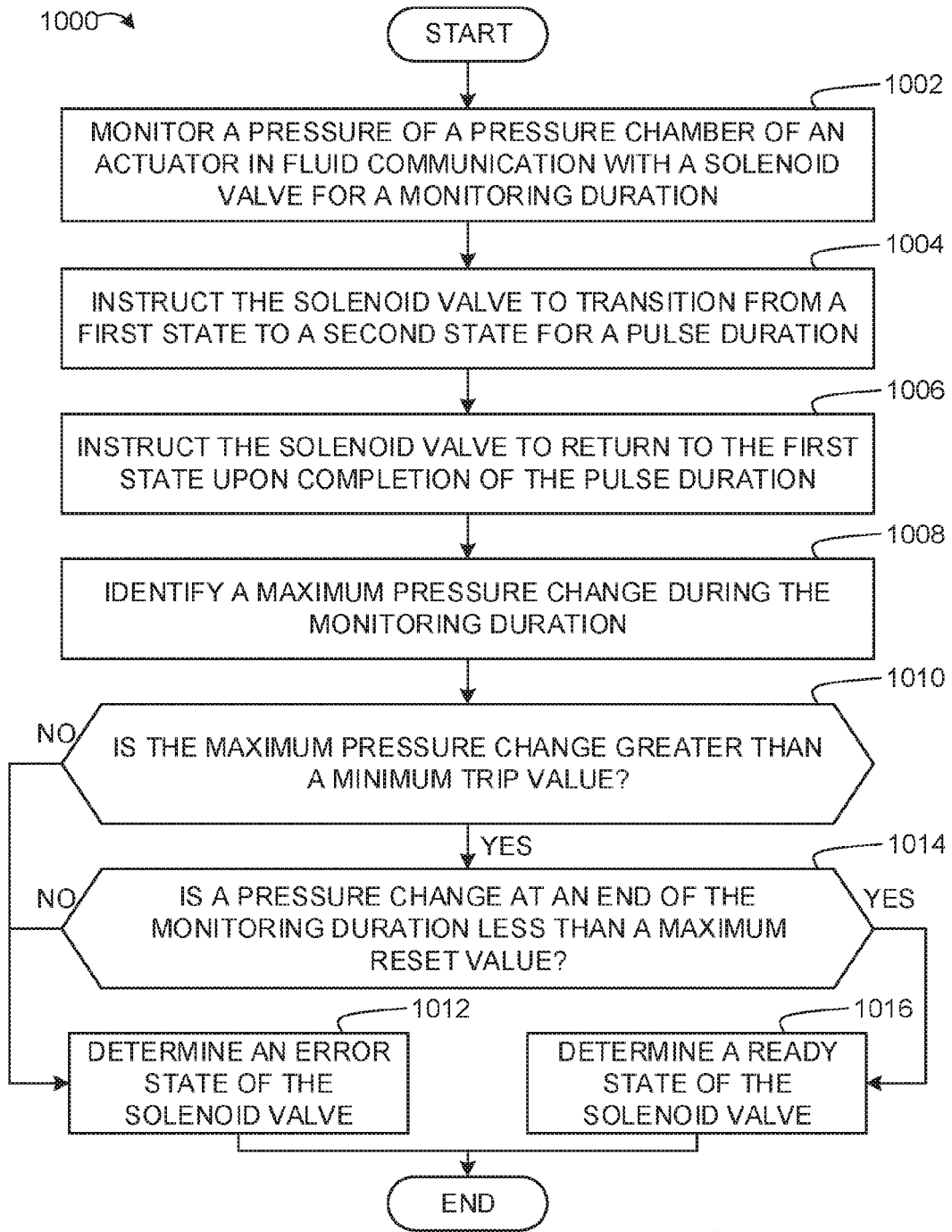
FIG. 10 is a flowchart representative of an example method to assess a test of the solenoid valve of FIGS. 2-7 via the positioner of FIGS. 1-2 and 5-7 in accordance with the teachings herein.

FIG. 10 is a flowchart representative of an example method 1000 to assess a test of an example solenoid valve via an example valve positioner in accordance with the teachings herein. Although the example method 1000 is described with reference to the flowchart illustrated in FIG. 10, many other methods of assessing the test of the solenoid valve via the valve positioner may alternatively be used. For example, the order of execution of the blocks may be changed, and/or some of the blocks described changed, eliminated, and/or combined. Further, the blocks of the example method 1000 may be implemented by executing corresponding instructions (e.g., first instructions, second instructions, third instructions, etc.) via a processor.

The example method 1000 for assessing a test of a solenoid valve via a valve positioner is discussed in connection with the example emergency system 100 of FIGS. 1-2 and 5-7, the example graph 800 of FIG. 8A, the example graph 828 of FIG. 8B and/or the example graph 900 of FIG. 9. Further, because the example method 1000 may refer to the example emergency system 100 of FIGS. 1-2 and 5-7, the example graph 800 of FIG. 8A, the example graph 828 of FIG. 8B and/or the example graph 900 of FIG. 9, components identified in FIGS. 1-9 having functions substantially similar or identical to the functions of components described below will not be described in detail again. Instead, the same reference numbers will be used for like structures.

The example method 1000 disclosed herein starts at block 1002 with a valve positioner (e.g., the valve positioner 106 of FIGS. 1-2 and 5-7) monitoring a pressure of a pressure chamber (e.g., the pressure chamber 516 of FIGS. 5-6) of an actuator (e.g., the actuator 104 of FIGS. 1-2 and 5-7) in fluid communication with a solenoid valve (e.g., the solenoid valve 202 of FIGS. 2-7) for a monitoring duration (e.g., the monitoring duration 812 of FIGS. 8A-8B). At block 1004, the valve positioner instructs (e.g., by interrupting power provided to) the solenoid valve to transition from a first state (e.g., an energized state, a normal state) to a second state (e.g., a de-energized state, an emergency state, a trip state) for a duration (e.g., the pulse duration 808 of FIGS. 8A-8B). At block 1006, the valve positioner instructs the solenoid valve to return to the first state upon completion and/or termination of the pulse duration. For example, the pulse signal induces a pressure change (e.g., the pressure change 802 of FIGS. 8A-9) such as a decrease and/or an increase in pressure that is measured by the valve positioner during the monitoring duration. In some examples, the solenoid valve is in the second state for the pulse duration that starts after the monitoring duration, is less than the monitoring duration, and ends before the monitoring duration.

At block 1008, the valve positioner identifies a maximum pressure change (e.g., the maximum pressure change 820 of FIGS. 8A-8B) during the monitoring duration. At block 1010, the method 1000 includes determining whether the maximum pressure change is greater than a minimum trip value (e.g., the minimum trip value 822 of FIGS. 8A-8B). If the maximum pressure change is not greater than the minimum trip value, the valve positioner determines that the solenoid valve is in an error and/or abnormal state and/or has malfunctioned (block 1012). At block 1014, if the maximum pressure change is greater than a minimum trip value, the method 1000 includes determining whether a pressure change at an end of the monitoring duration (e.g., the pressure change 824 at the monitoring end time 816 of FIG. 8A) is less than a maximum reset value (e.g., the maximum reset value 826 of FIG. 8A). Block 1014 may additionally and/or alternatively include determining whether the maximum pressure change is less than a maximum trip value (e.g., the maximum trip value 830 of FIG. 8B). If the pressure change at the end of the monitoring duration is not less than the maximum reset value (and/or if the maximum pressure change is not less than the maximum trip value), the valve positioner determines that the solenoid valve is in the error and/or abnormal state and/or has malfunctioned (block 1012). If the pressure change at the end of the monitoring duration is less than the maximum reset value (and/or if the maximum pressure change is less than the maximum trip value), the valve positioner determines that the solenoid valve is in a ready state in which the solenoid valve is able to actuate the actuator to close a shutdown valve (e.g., the shutdown valve 102 of FIGS. 1 and 5-7) upon detection of a hazardous and/or dangerous condition (block 1016).

Although certain example apparatus and methods have been described herein, the scope of coverage of this patent is not limited thereto. On the contrary, this patent covers all methods, apparatus and articles of manufacture fairly falling within the scope of the amended claims either literally or under doctrine of equivalents.

What is claimed is:

1. An apparatus comprising:
    a solenoid valve to enable an actuator to close an emergency valve; and
    a valve positioner fluidly and communicatively coupled to the solenoid valve, the valve positioner to:
        instruct the solenoid valve for a pulse duration to transition the solenoid valve from a first state to a second state, the pulse duration extending from a start time to a pulse end time, the solenoid valve to transition from the second state to the first state upon completion of the pulse duration;
        monitor a pressure change of a pressure chamber of the actuator in fluid communication with the solenoid valve relative to an initial pressure for a monitoring duration that extends from the start time to a monitoring end time;
        determine a maximum pressure change during the monitoring duration;
        determine the pressure change at the monitoring end time;
        compare the maximum pressure change to a minimum trip value;
        compare the pressure change at the monitoring end time to a maximum reset value; and
        determine a ready state or an error state of the solenoid valve based on whether the maximum pressure change is greater than the minimum trip value and whether the pressure change at the monitoring end time is less than the maximum reset value.

2. The apparatus of claim 1, wherein the valve positioner is to determine the error state in response to determining that the maximum pressure change is less than the minimum trip value or that the pressure change at the monitoring end time is greater than the maximum reset value.

3. The apparatus of claim 1, wherein the monitoring end time is subsequent to the pulse end time.

4. The apparatus of claim 1, wherein the valve positioner is to:
    determine the maximum pressure change by comparing the initial pressure of the pressure chamber to a minimum pressure of the pressure chamber measured during the monitoring duration; and
    determine the pressure change at the monitoring end time by comparing the initial pressure of the pressure chamber to a pressure of the pressure chamber measured at the monitoring end time.

5. The apparatus of claim 1, wherein the valve positioner is further to:
    compare the maximum pressure change to a maximum trip value; and
    determine the ready state or the error state of the solenoid valve based further on whether the maximum pressure change is less than the maximum trip value, the minimum trip value being approximately half the maximum trip value.

6. The apparatus of claim 1, wherein the maximum reset value is approximately twice a nominal pressure change relative to the initial pressure.

7. The apparatus of claim 1, wherein the valve positioner is to test the solenoid valve without causing the solenoid valve to actuate the emergency valve.

8. The apparatus of claim 1, wherein the valve positioner is to test the solenoid valve independently of testing the emergency valve.

9. A method comprising:
    instructing, by executing first instructions via a processor of a valve positioner, a solenoid valve for a pulse duration to transition from a first state to a second state, the solenoid valve to enable an actuator to close an emergency valve, the pulse duration extending from a start time to a pulse end time;
    instructing, by executing second instructions via the processor, the solenoid valve to transition from the second state to the first state at the pulse end time;
    monitoring, by executing third instructions via the processor, a pressure change of a pressure chamber of the actuator in fluid communication with the solenoid valve relative to an initial pressure for a monitoring duration that extends from the start time to a monitoring end time;

determining, by executing fourth instructions via the processor, a maximum pressure change during the monitoring duration;

determining, by executing fifth instructions via the processor, the pressure change at the monitoring end time;

comparing, by executing sixth instructions via the processor, the maximum pressure change to a minimum trip value;

comparing, by executing seventh instructions via the processor, the pressure change at the monitoring end time to a maximum reset value; and determining, by executing eighth instructions via the processor, a ready state or an error state of the solenoid valve based on whether the maximum pressure change is greater than the minimum trip value and whether the pressure change at the monitoring end time is less than the maximum reset value.

10. The method of claim 9, further including determining the error state in response to determining that the maximum pressure change is less than the minimum trip value or that the pressure change at the monitoring end time is greater than the maximum reset value.

11. The method of claim 10, wherein determining that the maximum pressure change is less than the minimum trip value indicates that the solenoid valve is slow to cause the actuator to close the emergency valve.

12. The method of claim 10, wherein determining that the pressure change at the monitoring end time is greater than the maximum reset value indicates that the solenoid valve is slow to cause the actuator to reopen the emergency valve upon closing.

13. The method of claim 9, wherein the monitoring end time is subsequent to the pulse end time.

14. The method of claim 9, wherein determining the maximum pressure change includes calculating a difference between the initial pressure of the pressure chamber and a minimum pressure of the pressure chamber measured during the monitoring duration.

15. The method of claim 9, wherein determining the pressure change at the monitoring end time includes calculating a difference between the initial pressure of the pressure chamber and a pressure of the pressure chamber measured at the monitoring end time.

16. The method of claim 9, further including:
comparing the maximum pressure change to a maximum trip value; and
determining the ready state or the error state of the solenoid valve based further on whether the maximum pressure change is less than the maximum trip value, the minimum trip value being approximately half the maximum trip value.

17. The method of claim 9, wherein the maximum reset value is approximately twice a nominal pressure change relative to the initial pressure.

18. The method of claim 9, wherein the determining of the ready state or the error state of the solenoid valve enables the solenoid valve to be tested when there is at least one of a varying upstream flow, a varying downstream flow, a delay in communication between the valve positioner and the solenoid valve, or a mechanical delay in transitioning the solenoid valve between the first state and the second state.

19. An apparatus comprising:
means for actuating an actuator to close an emergency valve; and
means for positioning fluidly and communicatively coupled to the means for actuating, the means for positioning to:
instruct the means for actuating for a pulse duration to transition the means for actuating from a first state to a second state, the pulse duration extending from a start time to a pulse end time, the means for actuating to transition from the second state to the first state upon completion of the pulse duration;
monitor a pressure change of a pressure chamber of the actuator in fluid communication with the means for actuating relative to an initial pressure for a monitoring duration that extends from the start time to a monitoring end time;
determine a maximum pressure change during the monitoring duration;
determine the pressure change at the monitoring end time;
compare the maximum pressure change to a minimum trip value;
compare the pressure change at the monitoring end time to a maximum reset value; and
determine a ready state or an error state of the means for actuating based on whether the maximum pressure change is greater than the minimum trip value and whether the pressure change at the monitoring end time is less than the maximum reset value.

20. The apparatus of claim 19, wherein the means for positioning is to determine the error state in response to determining that the maximum pressure change is less than the minimum trip value or that the pressure change at the monitoring end time is greater than the maximum reset value.

21. The apparatus of claim 1, wherein the valve positioner is to determine the ready state in response to determining that the maximum pressure change is greater than the minimum trip value and that the pressure change at the monitoring end time is less than the maximum reset value.

22. The method of claim 9, further including determining the ready state in response to determining that the maximum pressure change is greater than the minimum trip value and that the pressure change at the monitoring end time is less than the maximum reset value.

23. The apparatus of claim 19, wherein the means for positioning is to determine the ready state in response to determining that the maximum pressure change is greater than the minimum trip value and that the pressure change at the monitoring end time is less than the maximum reset value.

* * * * *